United States Patent
Ding et al.

(10) Patent No.: US 10,851,024 B2
(45) Date of Patent: Dec. 1, 2020

(54) CONCRETE PROTECTIVE AGENT AND PREPARATION METHOD THEREOF, AND CONCRETE PROTECTIVE FILM AND PREPARATION METHOD THEREOF

(71) Applicant: Shenzhen University, Guangdong (CN)

(72) Inventors: Zhu Ding, Guangdong (CN); Bingyao Tian, Guangdong (CN); Mingyan Wang, Guangdong (CN); Zhiwei Zhou, Guangdong (CN); Chen Sun, Guangdong (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 16/463,468

(22) PCT Filed: Jun. 7, 2017

(86) PCT No.: PCT/CN2017/087437
§ 371 (c)(1),
(2) Date: May 23, 2019

(87) PCT Pub. No.: WO2018/095011
PCT Pub. Date: May 31, 2018

(65) Prior Publication Data
US 2019/0276372 A1 Sep. 12, 2019

(30) Foreign Application Priority Data

Nov. 25, 2016 (CN) .......................... 2016 1 1053934

(51) Int. Cl.
| C04B 41/46 | (2006.01) |
| C04B 41/48 | (2006.01) |
| C04B 41/50 | (2006.01) |
| C04B 41/63 | (2006.01) |

(52) U.S. Cl.
CPC .......... *C04B 41/46* (2013.01); *C04B 41/4803* (2013.01); *C04B 41/4884* (2013.01); *C04B 41/501* (2013.01); *C04B 41/63* (2013.01)

(58) Field of Classification Search
CPC . C04B 41/4896; C04B 41/4803; C04B 41/46; C04B 41/47; C04B 41/4535; C04B 41/009; C04B 41/4556; C04B 41/502; C04B 41/63; C04B 41/62; C04B 41/501; C04B 28/02; C04B 2103/0066; C04B 2103/50; C04B 2111/27; C04B 2111/2015
See application file for complete search history.

(56) References Cited

U.S. PATENT DOCUMENTS 7,910,663 B2 * 3/2011 Taylor .................. C08K 5/0091
525/370

FOREIGN PATENT DOCUMENTS

| CN | 1109083 C | * | 5/2003 |
| CN | 102040396 A | | 5/2011 |
| CN | 102320860 A | | 1/2012 |
| CN | 102485699 A | * | 6/2012 |
| CN | 102863861 A | * | 1/2013 |
| CN | 103253985 A | | 8/2013 |
| CN | 104291741 A | * | 1/2015 |
| CN | 104877495 A | * | 9/2015 |
| CN | 104973885 A | | 10/2015 |
| CN | 106747654 A | | 5/2017 |
| KR | 100602793 B1 | | 7/2006 |

OTHER PUBLICATIONS

Zhou, Zichang et al., "Research on Surface Protection Technology for Hydraulic Concrete" Water Resources and Hydropower Engineering, No. 10, Dec. 31, 1995 (Dec. 31, 1995), ISSN: 1000-0860, pp. 19-23.
International Search Report and Written Opinion dated Aug. 29, 2017, for corresponding international application No. PCT/CN2017/087437.

* cited by examiner

*Primary Examiner* — Anthony J Green
(74) *Attorney, Agent, or Firm* — Westman, Champlin & Koehler, P.A.

(57) ABSTRACT

The present invention provides a concrete protective agent and a preparation method thereof, and a concrete protective film and a preparation method thereof. The concrete protective agent provided in the present invention includes the following components: water, oxalic acid, a defoaming agent, and a film-forming agent. When the concrete protective agent provided in the present invention is used for concrete protection, oxalic acid in the protective agent can react with calcium ions in concrete for in situ generation of calcium oxalate monohydrate inside and on a surface of concrete to obtain a protective film with strong adhesion to concrete. The film-forming agent in the protective agent is used as a template to adjust and control growth of calcium oxalate crystals, so as to improve waterproof performance and corrosion resistance to sulfate and chloride ions of the protective film. Preparation methods provided in the present invention are simple and practical and are suitable for mass production.

19 Claims, No Drawings

CONCRETE PROTECTIVE AGENT AND PREPARATION METHOD THEREOF, AND CONCRETE PROTECTIVE FILM AND PREPARATION METHOD THEREOF

CROSS REFERENCE

This application is a § 371 national phase entry of International Application No. PCT/CN2017/087437 filed Jun. 7, 2017 and claims priority to Chinese Patent Application No. 201611053934.7, filed with the Chinese Patent Office on Nov. 25, 2016 and entitled "CONCRETE PROTECTIVE AGENT AND PREPARATION METHOD THEREOF, AND CONCRETE PROTECTIVE FILM AND PREPARATION METHOD THEREOF", which is incorporated herein by reference in its entirety.

TECHNICAL FIELD

The present invention relates to the field of engineering protective materials, and in particular, to a concrete protective agent and preparation method thereof, and a concrete protective film and preparation method thereof.

BACKGROUND

Reinforced concrete is a most important building material in construction projects and is widely used in industrial buildings, civil buildings, transportation buildings, and various other buildings. However, buildings constructed by using reinforced concrete are often eroded by a corrosive medium during an application period. Therefore, if an anti-corrosion measure is not taken for structural materials during construction, a corrosive medium may damage a building structure or even make the building structure useless.

Surface treatment of concrete is one of effective ways to improve durability of concrete. A surface protective material can form an isolation layer between concrete and an external environment, and invasion of harmful substances such as water and chloride ions can be prevented or delayed by changing a surface property of concrete, thereby preventing and delaying deterioration of concrete, and improving durability of concrete. Conventional protective materials include epoxy resin, polyurethane, acrylic resin, chlorinated rubber, vinyl resin, and the like. Problems such as weak alkali resistance, low adhesion, poor durability, and inconvenient construction restrict application of these materials.

An organosilicon material can form a hydrophobic protective film on a surface of concrete, so as to improve waterproof and anti-permeability performance of concrete. However, there is poor mechanical, physical, and chemical compatibility between an inorganic material in concrete and the organosilicon material, a siloxane polycondensation reaction speed is low at room temperature, and silica gel is formed during use. A mesh structure of silica gel shrinks strongly as a solvent volatilize, relatively large stress damage is generated in all three-dimensional directions of micropores of a stone. Due to the foregoing characteristics, an organosilicon film-forming material is easy to peel off, and service time of the organosilicon film-forming material is shortened due to its sensitivity to ultraviolet rays.

An inorganic protective material reacts with concrete to form a soluble salt, which accelerates corrosion, and leads to poor waterproof performance and corrosion resistance to sulfate and chloride ions. There is relatively low adhesion between the inorganic protective material and concrete, and a reaction product blocks pores in a surface of concrete, inhibiting further penetration of a reinforcing agent. As a result, the protective material is easy to peel off.

SUMMARY

To overcome the foregoing shortcomings of the prior art, the present invention provides a concrete protective agent with a good protective effect and strong adhesion and preparation method thereof, and a concrete protective film and preparation method thereof.

The present invention provides a concrete protective agent, including the following components: water, oxalic acid, a defoaming agent, and a film-forming agent.

Preferably, a ratio of an amount of substance of oxalic acid to a volume of water is (0.5-3) mol:1 L.

Preferably, a mass percent of the defoaming agent relative to water is 1% to 3%.

Preferably, the defoaming agent includes one or more of emulsifying silicone oil, higher alcohol fatty acid ester complex, polyoxyethylene polyoxypropylene pentaerythritol ether, polyoxyethylene polyoxypropylene ether, polyoxypropylene glycerol ether, polyoxypropylene-polyoxyethylene glycerol ether, and polydimethylsiloxane.

Preferably, the defoaming agent includes a combination of higher alcohol fatty acid ester complex and polyoxypropylene glycerol ether or a combination of emulsifying silicone oil and polyoxyethylene polyoxypropylene ether.

Preferably, a mass ratio of the higher alcohol fatty acid ester complex to the polyoxypropylene glycerol ether is (5-9):(5-10).

Preferably, a mass ratio of the emulsifying silicone oil to the polyoxyethylene polyoxypropylene ether is preferably (1-4):(0.3-0.6).

Preferably, a mass percent of the film-forming agent in water is 0.5% to 2%.

Preferably, the film-forming agent includes one or more of propylenephenoxythol, Texanol™ (2,2,4-trimethyl-1,3-pentanediol monoisobutyrate), polyvinyl alcohol, chondroitin sulfate, butadiene resin, polyurethane, and nitrocellulose.

Preferably, the film-forming agent is a combination of polyurethane and nitrocellulose or a combination of polyvinyl alcohol and Texanol™ (2,2,4-trimethyl-1,3-pentanediol monoisobutyrate).

Preferably, a mass ratio of the polyurethane to the nitrocellulose is preferably (2-2.5):(2-3).

Preferably, a mass ratio of the polyvinyl alcohol to the Texanol™ is preferably (1-3):(0.2-0.5).

The present invention further provides a preparation method of the above concrete protective agent, including the following steps:

mixing water with oxalic acid to obtain an oxalic acid solution; and mixing the oxalic acid solution with a defoaming agent and a film-forming agent to obtain the concrete protective agent.

The present invention further provides a preparation method of a concrete protective film, where the concrete protective agent is coated on a surface of hardened concrete and dried to obtain a concrete protective film.

Preferably, a coating amount of the concrete protective agent is 3000 g/m$^2$ to 4000 g/m$^2$.

The present invention further provides the concrete protective film prepared by using the above preparation method, where a thickness of the concrete protective film is 20 μm to 40 μm.

Preferably, the concrete protective film includes calcium oxalate and calcium carbonate.

Preferably, the calcium oxalate is calcium oxalate monohydrate.

The present invention provides a concrete protective agent, including the following components: water, oxalic acid, a defoaming agent, and a film-forming agent. When the concrete protective agent provided in the present invention is used for concrete protection, oxalic acid in the protective agent can react with calcium ions in concrete for in situ generation of calcium oxalate monohydrate inside and on a surface of concrete, so as to obtain a protective film with strong adhesion to concrete. The film-forming agent in the protective agent is used as a template to adjust and control growth of calcium oxalate crystals, so as to improve waterproof performance and corrosion resistance to sulfate and chloride ions of the protective film. Experiment results show that: After the concrete protective film provided in the present invention is soaked in 5% magnesium sulfate solution for 28 days, an erosion depth of the concrete protective film is 0.08 mm, and after the concrete protective film is dried and then soaked in water, saturated water absorptivity of the concrete protective film is 2.1%; after the concrete protective film is soaked in 3% sodium chloride solution for 28 days, an erosion depth of the concrete protective film is 0.12 mm, and after the concrete protective film is dried and then soaked in water, saturated water absorptivity of the concrete protective film is 2.5% and peel strength is 6.0 N.

DETAILED DESCRIPTION

The present invention provides a concrete protective agent, including the following components: water, oxalic acid, a defoaming agent, and a film-forming agent.

The concrete protective agent provided in the present invention includes water. In the present invention, water is used as a solvent of the protective agent, to allow the components to be mixed uniformly.

The concrete protective agent provided in the present invention includes oxalic acid. In the present invention, a ratio of an amount of substance of oxalic acid to a volume of water is (0.5-3) mol:1 L and more preferably (1-2) mol:1 L. In the present invention, oxalic acid can react with calcium ions in concrete for in situ generation of calcium oxalate monohydrate on a surface of concrete, to obtain a protective film with strong adhesion to concrete.

The concrete protective agent provided in the present invention includes a defoaming agent. In the present invention, a mass percent of the defoaming agent relative to water is 1% to 3% and more preferably 1.5% to 2.5%. In the present invention, the defoaming agent preferably includes one or more of emulsifying silicone oil, higher alcohol fatty acid ester complex, polyoxyethylene polyoxypropylene pentaerythritol ether, polyoxyethylene polyoxypropylene ether, polyoxypropylene glycerol ether, polyoxypropylene-polyoxyethylene glycerol ether, and polydimethylsiloxane. In the present invention, the defoaming agent may be specifically a combination of higher alcohol fatty acid ester complex and polyoxypropylene glycerol ether or a combination of emulsifying silicone oil and polyoxyethylene polyoxypropylene ether. In the present invention, when the defoaming agent is the combination of higher alcohol fatty acid ester complex and polyoxypropylene glycerol ether, a mass ratio of the higher alcohol fatty acid ester complex to the polyoxypropylene glycerol ether is preferably (5-9):(5-10). In the present invention, when the defoaming agent is the combination of higher alcohol fatty acid ester complex and polyoxypropylene glycerol ether, a mass ratio of the emulsifying silicone oil to the polyoxyethylene polyoxypropylene ether is preferably (1-4):(0.3-0.6).

The concrete protective agent provided in the present invention includes a film-forming agent. In the present invention, a mass percent of the film-forming agent relative to water is 0.5% to 2% and more preferably 1% to 1.5%. In the present invention, the film-forming agent preferably includes one or more of propylenephenoxythol, Texanol™ (2,2,4-trimethyl-1,3-pentanediol monoisobutyrate), polyvinyl alcohol, chondroitin sulfate, butadiene resin, polyurethane, and nitrocellulose. In the present invention, the film-forming agent may be specifically a combination of polyurethane and nitrocellulose or a combination of polyvinyl alcohol and Texanol™ (2,2,4-trimethyl-1,3-pentanediol monoisobutyrate). In the present invention, when the film-forming agent is a combination of polyurethane and nitrocellulose, a mass ratio of the polyurethane to the nitrocellulose is preferably (2-2.5):(2-3). In the present invention, when the film-forming agent is a combination of polyvinyl alcohol and Texanol™ (2,2,4-trimethyl-1,3-pentanediol monoisobutyrate), a mass ratio of the polyvinyl alcohol to the Texanol™ is preferably (1-3):(0.2-0.5). In the present invention, as a template, the film-forming agent is used as a template and can adjust and control growth of calcium oxalate crystals.

The present invention further provides a preparation method of the concrete protective agent in the foregoing technical solution, including the following steps: mixing water with oxalic acid to obtain an oxalic acid solution; and mixing the oxalic acid solution with a defoaming agent and a film-forming agent to obtain the concrete protective agent.

A mixing operation is not particularly limited in the present invention, as long as a solution of a mixing technology solution well known to a person skilled in the art is used. In the present invention, mixing is preferably performed in a stirring condition, a stirring speed is preferably 170 r/min to 190 r/min, and a stirring time is preferably 1 min to 3 min.

The present invention further provides a preparation method of a concrete protective film, and the concrete protective agent in the foregoing technical solution is coated on a surface of hardened concrete and dried to form a film. A coating operation is not particularly limited in the present invention, as long as a coating technology solution well known to a person skilled in the art is used. In the present invention, coating is preferably spray coating or painting. In the present invention, a coating amount of the concrete protective agent is preferably 3000 g/m$^2$ to 4000 g/m$^2$ and more preferably 3300 g/m$^2$ to 3800 g/m$^2$.

A drying operation is not particularly limited in the present invention, as long as a drying technology solution well known to a person skilled in the art is used. In the present invention, drying is preferably natural drying.

The present invention further provides the concrete protective film prepared by using the preparation method in the foregoing technical solution, and a thickness of the concrete protective film is 20 μm to 40 μm and is preferably 23 μm to 26 μm.

In the present invention, the concrete protective film preferably includes calcium oxalate and calcium carbonate. In the present invention, calcium oxalate is preferably calcium oxalate monohydrate ($CaC_2O_4$—$H_2O$).

With reference to embodiments, the following describes the concrete protective agent, the concrete protective film, and the preparations method thereof that are provided in the present invention, but they are not construed as limitation on the protection scope of the present invention.

Embodiment 1

At room temperature, 200 g water is poured into 12.8 g oxalic acid dihydrate, and stirred for 2 min at the rotation speed of 180 r/min.

Then, 2.128 g chondroitin sulfate is added to the mixed solution, and further stirred for 2 min at the same rotation speed as that in the foregoing step.

1.2 g higher alcohol fatty acid ester complex and 1.0 g polyoxypropylene glycerol ether are added to the mixed solution, and stirred for 1 min at the rotation speed of 180 r/min, so as to obtain a concrete protective agent.

Embodiment 2

8 g of the concrete protective agent prepared in Embodiment 1 is coated on a surface of hardened concrete for three layers, and the test block is dried at 30° C. for 1 h.

In this way, a concrete protective film is obtained.

A thickness of the concrete protective film prepared in this embodiment is 20 μm. After the concrete protective film is soaked in 5% magnesium sulfate solution for 28 days, an erosion depth of the concrete protective film is 0.1 mm, and after the concrete protective film is dried and then soaked in water, saturated water absorptivity of the concrete protective film is 3.8%. After the concrete protective film is soaked in 3% sodium chloride solution for 28 days, an erosion depth of the concrete protective film is 0.8 mm, and after the concrete protective film is dried and then soaked in water, saturated water absorptivity of the concrete protective film is 3.8% and peel strength is 5.1 N.

Embodiment 3

At room temperature, 200 g water is poured into 25.6 g oxalic acid dihydrate, and stirred for 2 min at the rotation speed of 180 r/min.

Then, 3.384 g chondroitin sulfate is added to the mixed solution, and further stirred for 2 min at the same rotation speed as that in the foregoing step.

0.2 g emulsifying silicone oil is added to the mixed solution, and stirred for 1 min at the rotation speed of 180 r/min, so as to obtain a concrete protective agent.

Embodiment 4

8 g of the concrete protective agent prepared in Embodiment 3 is coated on a surface of hardened concrete for three layers, and the test block is dried at 30° C. for 1 h.

In this way, a concrete protective film is obtained.

A thickness of the concrete protective film prepared in this embodiment is 22 μm. After the concrete protective film is soaked in 5% magnesium sulfate solution for 28 days, an erosion depth of the concrete protective film is 0.1 mm, and after the concrete protective film is dried and then soaked in water, saturated water absorptivity of the concrete protective film is 3.4%. After the concrete protective film is soaked in 3% sodium chloride solution for 28 days, an erosion depth of the concrete protective film is 0.3 mm, and after the concrete protective film is dried and then soaked in water, saturated water absorptivity of the concrete protective film is 3.6% and peel strength is 5.3 N.

Embodiment 5

At room temperature, 200 g water is poured into 38.4 g oxalic acid dihydrate, and stirred for 2 min at the rotation speed of 180 r/min.

Then, 4.0 g propylenephenoxythol pph is added to the mixed solution, and further stirred for 2 min at the same rotation speed as that in the foregoing step.

1.2 g polyoxypropylene glycerol ether is added to the mixed solution, and stirred for 1 min at the rotation speed of 180 r/min, so as to obtain a concrete protective agent.

Embodiment 6

8 g of the concrete protective agent prepared in Embodiment 5 is coated on a surface of hardened concrete for three layers, and the test block is dried at 30° C. for 1 h, so as to obtain a concrete protective film.

A thickness of the concrete protective film prepared in this embodiment is 30 μm. After the concrete protective film is soaked in 5% magnesium sulfate solution for 28 days, an erosion depth of the concrete protective film is 0.08 mm, and after the concrete protective film is dried and then soaked in water, saturated water absorptivity of the concrete protective film is 2.1%. After the concrete protective film is soaked in 3% sodium chloride solution for 28 days, an erosion depth of the concrete protective film is 0.12 mm, and after the concrete protective film is dried and then soaked in water, saturated water absorptivity of the concrete protective film is 2.5% and peel strength is 6.0 N.

Embodiment 7

At room temperature, 200 g water is poured into 51.2 g oxalic acid dihydrate, and stirred for 2 min at the rotation speed of 180 r/min.

Then, 4.2 g Texanol™ (2,2,4-trimethyl-1,3-pentanediol monoisobutyrate) is added to the mixed solution, and further stirred for 2 min at the same rotation speed as that in the foregoing step.

1.0 g polyoxyethylene polyoxypropylene ether is added to the mixed solution, and stirred for 1 min at the rotation speed of 180 r/min, so as to obtain a concrete protective agent.

Embodiment 8

9 g of the concrete protective agent prepared in Embodiment 7 is coated on a surface of hardened concrete for three layers, and the test block is dried at 35° C. for 0.5 h, so as to obtain a concrete protective film.

A thickness of the concrete protective film prepared in this embodiment is 24 After the concrete protective film is soaked in 5% magnesium sulfate solution for 28 days, an erosion depth of the concrete protective film is 0.16 mm, and after the concrete protective film is dried and then soaked in water, saturated water absorptivity of the concrete protective film is 3.3%. After the concrete protective film is soaked in 3% sodium chloride solution for 28 days, an erosion depth of the concrete protective film is 0.18 mm, and after the concrete protective film is dried and then soaked in water, saturated water absorptivity of the concrete protective film is 3.1% and peel strength is 5.0 N.

Embodiment 9

At room temperature, 200 g water is poured into 51.2 g oxalic acid dihydrate, and stirred for 2 min at the rotation speed of 180 r/min.

Then, 4.2 g Texanol™ (2,2,4-trimethyl-1,3-pentanediol monoisobutyrate) is added to the mixed solution, and further stirred for 2 min at the same rotation speed as that in the foregoing step.

1.0 g polyoxyethylene polyoxypropylene ether is added to the mixed solution, and stirred for 1 min at the rotation speed of 180 r/min, so as to obtain a concrete protective agent.

Embodiment 10

9 g of the concrete protective agent prepared in Embodiment 9 is coated on a surface of hardened concrete for three layers, and the test block is dried at 35° C. for 0.5 h, so as to obtain a concrete protective film.

A thickness of the concrete protective film prepared in this embodiment is 26 μm. After the concrete protective film is soaked in 5% magnesium sulfate solution for 28 days, an erosion depth of the concrete protective film is 0.10 mm, and after the concrete protective film is dried and then soaked in water, saturated water absorptivity of the concrete protective film is 3.5%. After the concrete protective film is soaked in 3% sodium chloride solution for 28 days, an erosion depth of the concrete protective film is 0.11 mm, and after the concrete protective film is dried and then soaked in water, saturated water absorptivity of the concrete protective film is 3.6% and peel strength is 4.5 N.

Embodiment 11

At room temperature, 200 g water is poured into 76.8 g oxalic acid dihydrate, and stirred for 2 min at the rotation speed of 180 r/min.

Then, 16 g polyvinyl alcohol powder PVA is added to the mixed solution, and further stirred for 2 min at the same rotation speed as that in the foregoing step.

0.8 g polyoxypropylene glycerol ether is added to the mixed solution, and stirred for 1 min at the rotation speed of 180 r/min, so as to obtain a concrete protective agent.

Embodiment 12

9 g of the concrete protective agent prepared in Embodiment 11 is coated on a surface of hardened concrete for three layers, and the test block is dried at 35° C. for 0.5 h, so as to obtain a concrete protective film.

A thickness of the concrete protective film prepared in this embodiment is 24 μm. After the concrete protective film is soaked in 5% magnesium sulfate solution for 28 days, an erosion depth of the concrete protective film is 0.2 mm, and after the concrete protective film is dried and then soaked in water, saturated water absorptivity of the concrete protective film is 3.8%. After the concrete protective film is soaked in 3% sodium chloride solution for 28 days, an erosion depth of the concrete protective film is 0.25 mm, and after the concrete protective film is dried and then soaked in water, saturated water absorptivity of the concrete protective film is 3.9% and peel strength is 4.2 N.

Embodiment 13

At room temperature, 200 g water is poured into 12.8 g oxalic acid dihydrate, and stirred for 2 min at the rotation speed of 180 r/min.

Then, 1.87 g polyurethane and 2.33 g nitrocellulose are added to the mixed solution, and further stirred for 2 min at the same rotation speed as that in the foregoing step.

0.36 g higher alcohol fatty acid ester complex and 0.74 g polyoxypropylene glycerol ether are added to the mixed solution, and stirred for 1 min at the rotation speed of 180 r/min, so as to obtain a concrete protective agent.

Embodiment 14

9 g of the concrete protective agent prepared in Embodiment 13 is coated on a surface of hardened concrete for three layers, and the test block is dried at 30° C. for 1 h, so as to obtain a concrete protective film.

A thickness of the concrete protective film prepared in this embodiment is 26 μm. After the concrete protective film is soaked in 5% magnesium sulfate solution for 28 days, an erosion depth of the concrete protective film is 0.09 mm, and after the concrete protective film is dried and then soaked in water, saturated water absorptivity of the concrete protective film is 3.2%. After the concrete protective film is soaked in 3% sodium chloride solution for 28 days, an erosion depth of the concrete protective film is 0.11 mm, and after the concrete protective film is dried and then soaked in water, saturated water absorptivity of the concrete protective film is 3.3% and peel strength is 4.6 N.

Embodiment 15

At room temperature, 200 g water is poured into 25.6 g oxalic acid dihydrate, and stirred for 2 min at the rotation speed of 180 r/min.

Then, 0.71 g polyurethane, 2.85 g nitrocellulose, 0.21 emulsifying silicone oil, and 0.43 g polyoxyethylene polyoxypropylene ether are added to the mixed solution, and further stirred for 2 min at the same rotation speed as that in the foregoing step.

0.20 g higher alcohol fatty acid ester complex, 0.81 g polyoxypropylene glycerol ether, 0.06 emulsifying silicone oil, and 0.12 g polyoxyethylene polyoxypropylene ether are added to the mixed solution, and stirred for 1 min at the rotation speed of 180 r/min, so as to obtain a concrete protective agent.

Embodiment 16

9 g of the concrete protective agent prepared in Embodiment 15 is coated on a surface of hardened concrete for three layers, and the test block is dried at 30° C. for 1 h, so as to obtain a concrete protective film.

A thickness of the concrete protective film prepared in this embodiment is 26 μm. After the concrete protective film is soaked in 5% magnesium sulfate solution for 28 days, an erosion depth of the concrete protective film is 0.08 mm, and after the concrete protective film is dried and then soaked in water, saturated water absorptivity of the concrete protective film is 3.3%. After the concrete protective film is soaked in 3% sodium chloride solution for 28 days, an erosion depth of the concrete protective film is 0.10 mm, and after the concrete protective film is dried and then soaked in water, saturated water absorptivity of the concrete protective film is 3.2% and peel strength is 4.6 N.

The above description of the embodiment is only for helping to understand the method of the present invention and its core idea. It should be noted that, several improvements and modifications may be made by persons of ordinary skill in the art without departing from the principle of the present invention, and these improvements and modifications should also be considered within the protection scope of the present invention. Various modifications to these embodiments are readily apparent to persons skilled in the art, and the generic principles defined herein may be practiced in other embodiments without departing from the spirit or scope of the invention. Thus, the present invention is not limited to the embodiments shown herein but falls within the widest scope consistent with the principles and novel features disclosed herein.

What is claimed is:

1. A concrete protective agent, comprising the following components: water, oxalic acid, a defoaming agent, and a film-forming agent, wherein a ratio of an amount of substance of oxalic acid to a volume of water is (0.5-3) mol:1 L.

2. The concrete protective agent according to claim 1, wherein a mass percent of the defoaming agent relative to water is 1% to 3%.

3. The concrete protective agent according to claim 1, wherein the defoaming agent comprises one or more of emulsifying silicone oil, higher alcohol fatty acid ester complex, polyoxyethylene polyoxypropylene pentaerythritol ether, polyoxyethylene polyoxypropylene ether, polyoxypropylene glycerol ether, polyoxypropylene-polyoxyethylene glycerol ether, and polydimethylsiloxane.

4. The concrete protective agent according to claim 3, wherein the defoaming agent comprises a combination of higher alcohol fatty acid ester complex and polyoxypropylene glycerol ether or a combination of emulsifying silicone oil and polyoxyethylene polyoxypropylene ether.

5. The concrete protective agent according to claim 4, wherein the defoaming agent comprises a combination of higher alcohol fatty acid ester complex and polyoxypropylene glycerol ether, and wherein a mass ratio of the higher alcohol fatty acid ester complex to the polyoxypropylene glycerol ether is (5-9):(5-10).

6. The concrete protective agent according to claim 4, wherein the defoaming agent comprises a combination of emulsifying silicone oil and polyoxyethylene polyoxypropylene ether, and wherein a mass ratio of the emulsifying silicone oil to the polyoxyethylene polyoxypropylene ether is (1-4):(0.3-0.6).

7. The concrete protective agent according to claim 1, wherein a mass percent of the film-forming agent in water is 0.5% to 2%.

8. The concrete protective agent according to claim 1, wherein the film-forming agent comprises one or more of propylenephenoxythol, 2,2,4-trimethyl-1,3-pentanediol monoisobutyrate, polyvinyl alcohol, chondroitin sulfate, butadiene resin, polyurethane, and nitrocellulose.

9. The concrete protective agent according to claim 8, wherein the film-forming agent is a combination of polyurethane and nitrocellulose or a combination of polyvinyl alcohol and 2,2,4-trimethyl-1,3-pentanediol monoisobutyrate.

10. The concrete protective agent according to claim 9, wherein the film-forming agent is a combination of polyurethane and nitrocellulose, and wherein a mass ratio of the polyurethane to the nitrocellulose is (2-2.5):(2-3).

11. The concrete protective agent according to claim 9, wherein the film-forming agent is a combination of polyvinyl alcohol and 2,2,4-trimethyl-1,3-pentanediol monoisobutyrate, and wherein a mass ratio of the polyvinyl alcohol to the 2,2,4-trimethyl-1,3-pentanediol monoisobutyrate is (1-3):(0.2-0.5).

12. A preparation method of the concrete protective agent according to claim 1, comprising the following steps:
mixing water with oxalic acid to obtain an oxalic acid solution; and
mixing the oxalic acid solution with a defoaming agent and a film-forming agent to obtain the concrete protective agent.

13. A preparation method of a concrete protective film, wherein the concrete protective agent according to claim 1 is coated on a surface of hardened concrete and dried to obtain a concrete protective film.

14. The preparation method according to claim 13, wherein a coating amount of the concrete protective agent is 3000 g/m$^2$ to 4000 g/m$^2$.

15. A preparation method of a concrete protective film, wherein the concrete protective agent prepared by using the preparation method according to claim 12 is coated on a surface of hardened concrete and dried to obtain a concrete protective film.

16. The preparation method according to claim 14, wherein a coating amount of the concrete protective agent is 3000 g/m$^2$ to 4000 g/m$^2$.

17. The concrete protective film prepared by using the preparation method according to claim 13, wherein a thickness of the concrete protective film is 20 μm to 40 μm.

18. The concrete protective film according to claim 17, wherein the concrete protective film comprises calcium oxalate and calcium carbonate.

19. The concrete protective film according to claim 18, wherein the calcium oxalate is calcium oxalate monohydrate.

* * * * *